United States Patent
Jara

[11] Patent Number: 5,858,138
[45] Date of Patent: Jan. 12, 1999

[54] CARCASS REINFORCEMENT, MADE OF A SINGLE FILAMENT, FOR A TIRE

[75] Inventor: Adam Jara, Clermont-Ferrand, France

[73] Assignee: Compagnie Generale des Etablissements Michelin - Michelin & Cie, Clermont-Ferrand Cedex, France

[21] Appl. No.: 974,896

[22] Filed: Nov. 20, 1997

[30] Foreign Application Priority Data

Nov. 21, 1996 [FR] France .................................. 96 14356

[51] Int. Cl.⁶ ........................................................ B60C 9/02
[52] U.S. Cl. .......................... 152/551; 152/548; 152/552; 152/563; 156/117
[58] Field of Search ...................... 152/551, 548, 152/550, 552, 563; 156/117, 397, 133

[56] References Cited

U.S. PATENT DOCUMENTS

| | | |
|---|---|---|
| 4,277,295 | 7/1981 | Schmidt et al. |
| 5,308,432 | 5/1994 | Siegenthaler |
| 5,462,104 | 10/1995 | Siegenthaler .......................... 152/563 |

FOREIGN PATENT DOCUMENTS

| | | |
|---|---|---|
| 0549869 | 7/1993 | European Pat. Off. |
| 0583615 | 2/1994 | European Pat. Off. |
| 0658449 | 6/1995 | European Pat. Off. |

*Primary Examiner*—Geoffrey L. Knable
*Attorney, Agent, or Firm*—Baker & Botts, L.L.P.

[57] ABSTRACT

A radial tire having two carcass half-reinforcements anchored on each side of the tire in a bead, the base of which is intended to be mounted on a bead seat of a wheel rim, each bead having at least one bead wire, the carcass half-reinforcements being joined together by connecting means. Each carcass half-reinforcement consists of a carcass filament which is wrapped around the bead wire to form adjacent strands running from said bead wire at least as far as said connecting means. The strands are arranged in a number of groups of two adjacent strands connected by a loop at the connecting means, the two adjacent strands of each group passing axially on the same side of the bead wire, and alternately axially on one side then on the other side of the bead wire, when passing from one group to the next group.

4 Claims, 2 Drawing Sheets

CARCASS REINFORCEMENT, MADE OF A SINGLE FILAMENT, FOR A TIRE

BACKGROUND OF THE INVENTION

The present invention relates to tires. More particularly, it relates to the arrangement of reinforcing filaments in the beads, and more generally, deals with the design of the carcass.

Tire carcass reinforcements usually consist of one or more plies, currently usually radial plies, wrapped around one or more bead wires arranged in the beads. The beads constitute the means that allow the tire to be fixed to the wheel rim. The fact that the carcass reinforcements consist of plies means that these need to be produced by calendering and then cutting them at the desired angle (90° to the direction of the filaments for a radial carcass) into pieces of the desired length, these pieces then being joined together by welding parallel to the filaments. All these operations constitute separate preparatory steps in the actual assembly of the tire. The existence of these preparatory early steps makes managing work flow through manufacturing shops more complicated.

It has already been proposed that tire carcasses be produced from a single filament. The difficulty in this case lies in designing carcasses which are durable enough to fulfill their function of being a structure that reinforces the tire and which, by the path taken by the carcass filament, are as easy as possible to produce in a mechanized way.

As an illustration, the proposals contained in patents U.S. Pat. No. 4,277,295 and U.S. Pat. No. 5,308,432 may be mentioned. However, mechanizing the movements of a laying member that carries out the first of these proposals is not simple. Furthermore, having knots or crossing filaments in the bead of the tire is advised against because the tension of the filaments in this region is considerable. As regards the second proposal, it has the drawback of the difficulty in transferring the reel from one line to the other on each side of the tire. Furthermore, given the necessarily non-zero bulk of the members that move the reel, and given the bulk of this reel, it is not possible either in the first proposal or in the second for the last carcass-reinforcing arches to be laid with said reel continuing the same movement. The problem is that at the end of laying, the mechanism comes up against the first arches laid well before the last ones have been laid, this point being reached all the earlier, the bulkier the reel.

In practice, a reel of this kind is quite bulky. It is therefore difficult to make it accelerate a great many times because of its weight and its inertia, and it is difficult to make it run around the bead wire because the space available is small, especially if the tire is manufactured on a former which more or less corresponds to its future internal volume, this being especially true if the bead wire is close to the end-position it will occupy in the finished tire.

SUMMARY OF THE INVENTION

The object of the invention is to propose a new carcass reinforcement composed of two symmetric elements connected at the crown, each of which is produced from a single filament, which has the required mechanical strength and endurance. Each half-reinforcement can be produced simply, using different types of filament or different types of material.

The radial tire according to the invention comprises two carcass half-reinforcements anchored on each side of the tire in a bead, the base of which is intended to be mounted on a bead seat of a wheel rim, each bead comprising at least one bead wire, said carcass half-reinforcements being joined together by connecting means, each carcass half-reinforcement consisting of a carcass filament which is wrapped around said bead wire and forms adjacent strands running from said bead wire at least as far as said connecting means, said strands being arranged in a number of groups of two adjacent strands connected by a loop at said connecting means, said two adjacent strands of each group passing axially round the same side of the bead wire, and alternately axially round one side then round the other side of the bead wire, when passing from one group to the next group.

In this text, the term "filament" denotes very generally both monofilaments and multifilaments or assemblies, such as textile or metal cords, twisted cords or indeed any type of equivalent assembly, such as a compound cord for example, and this will be true irrespective of the material or materials or possible treatment of these filaments, for example a surface treatment or coating, or prior application of adhesive to encourage them to stick to the rubber or any other material.

Because there are loops at the tread, and because there is wrapping around the bead wire, it can be seen that the carcass reinforcement is of the "single-filament" type. Of course, it would be possible for the carcass reinforcement not to be manufactured continuously from a single filament. There could be a discontinuity in the filament, for example as a result of a change of reel. According to the present invention, it is, however, appropriate for just one filament or a small number of filaments to be used per carcass reinforcement, and the starts and ends of the filaments should be positioned under the tread to avoid any discontinuities in the bottom of the bead (knots for example).

Let us note that joining the two symmetric carcass half-reinforcements together presents no problems when the joinder is under the tread because it is known that the tensile forces in the filaments forming the reinforcement are practically zero at this point. Producing the carcass as half-reinforcements makes it possible to simplify the industrial installation required and makes it possible to obtain a method which is very durable from the industrial viewpoint.

All the embodiment details are given in the description which follows, which is to be read in conjunction with the following figures:

DESCRIPTION OF PREFERRED EMBODIMENTS

Figure 1:
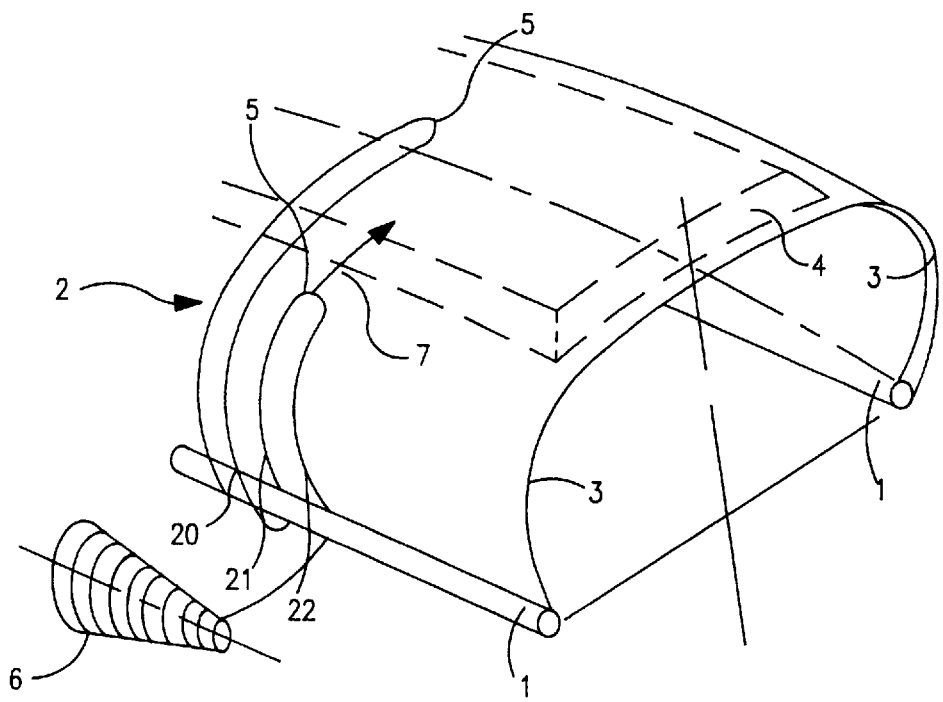
FIGS. 1 to 3 illustrate diagrammatically how a half-carcass according to the invention can be manufactured.
Figure 2:
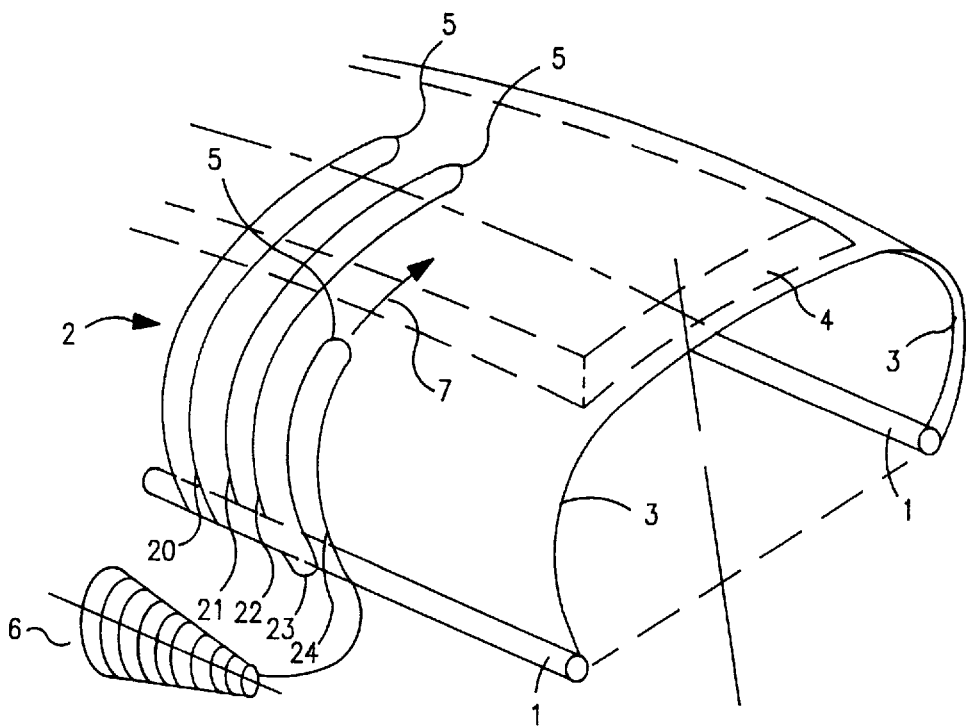
Figure 3:
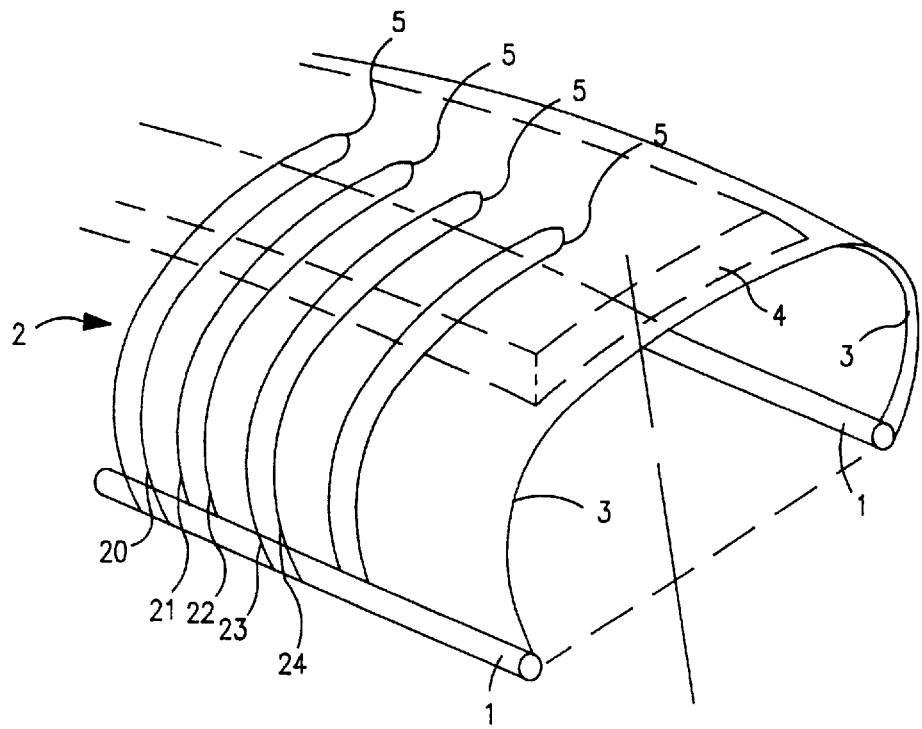

Depicted diagrammatically and in perspective in FIGS. 1 to 3 is a tire carcass half-reinforcement which includes a bead wire 1 and a carcass filament 2. As the carcass is radial, the filament 2 forms adjacent strands 20, 21, 22, 23, 24 in the side wall 3. In this embodiment, said strands are arranged more or less radially.

The route taken by the carcass filament 2 can be seen, starting with the strand denoted by the reference 20. The filament passes around the axially outer side of the bead wire 1. It is wrapped around said bead wire 1, passes on the axially inner side thereof, then lies in the form of a strand 21 next to the previous one. The filament 2 makes a half turn under the tread 4. A loop 5 thus connects two adjacent strands 21 and 22. The strand 22 passes axially on the inner side of the bead wire 1. It therefore passes, and this is a feature of the invention, axially on the same side as the strand 21. The filament 2 is wrapped around the bead wire 1 then travels back up in the sidewall 3 of the tire. It thus forms the strand 23. Then, as before, it forms a loop 5 under the tread 4. Thereafter, the next strand, that is to say the strand 24, passes on the same side of the bead wire 1 as the strand 23, that is, on the outer side.

Each carcass half-reinforcement is constructed gradually as has just been explained. If it is considered that the strands 21 and 22 form one group, that the strands 23 and 24 form the next group, which is next to the previous group, then the carcass half-reinforcement according to the invention comprises a number of groups of two adjacent strands, said two adjacent strands of each group passing axially round the same side of the bead wire, and alternately axially on one side of the bead wire then the other, passing from one group to the next group.

The principle of mechanized manufacture is illustrated by looking at the change between FIGS. 1 to 3. A carcass half-reinforcement is manufactured, for example, on a rigid former. This former may be precoated with a first layer, especially of nonvulcanized rubber if a rubber tire is being manufactured. It is considered that manufacturing starts with the strand 20, the free end of which is secured under the future tread 4 of the tire. Further on from the strand 20, the filament meets a supply device, for example a reel 6 situated radially lower down than the bead wire 1. The filament is pulled behind the bead wire to form a loop 5, for example by means of a hook as depicted diagrammatically by the arrow 7. By pulling said loop 5 up as far as the tread 4, the two strands 21 and 22 (see FIG. 1) can be laid down. Note that in order to achieve this, it is not necessary for a reel to pass behind the bead wire 1. The amount of space occupied by this reel therefore does not in any way affect this phase of the process of laying down the filament 2.

Next, this time passing in front of the bead wire 1, the filament is pulled out, starting to form a loop 5 as before (see 7 in FIG. 2), also using a hook or any other mechanism which, in this case, can act at least partly simultaneously. In this way, the next strands 23 and 24 can be laid down by pulling the filament toward the tread. This can also be done with the reel moving, without the amount of space it occupies posing any problem, because there is full freedom of movement.

Gradually, a carcass half-reinforcement can thus be produced around the entire periphery of the former.

It is known that the tensile forces in the filaments forming the reinforcement of a radial carcass are low or zero under the tread. There is therefore a great deal of freedom to choose connecting means. If the tire is made with a rubber carcass coating, use is preferably made of a former that defines the internal shape of the tire, at least approximately. This former is precoated with nonvulcanized rubber. All that is then required is for said loops to be laid on the rubber coating as need be, pressing them in a little to ensure that the carcass reinforcement will be stable while it is being manufactured. If the carcass is produced by injection or cast in an elastomeric material in the liquid state, for example polyurethane, the two carcass half-reinforcements need to be secured temporarily before the mold is closed, and the elastomer introduced. Thereafter, irrespective of the type of matrix, the fact that the filaments are impregnated in the matrix will give the required cohesion.

Figure 4:
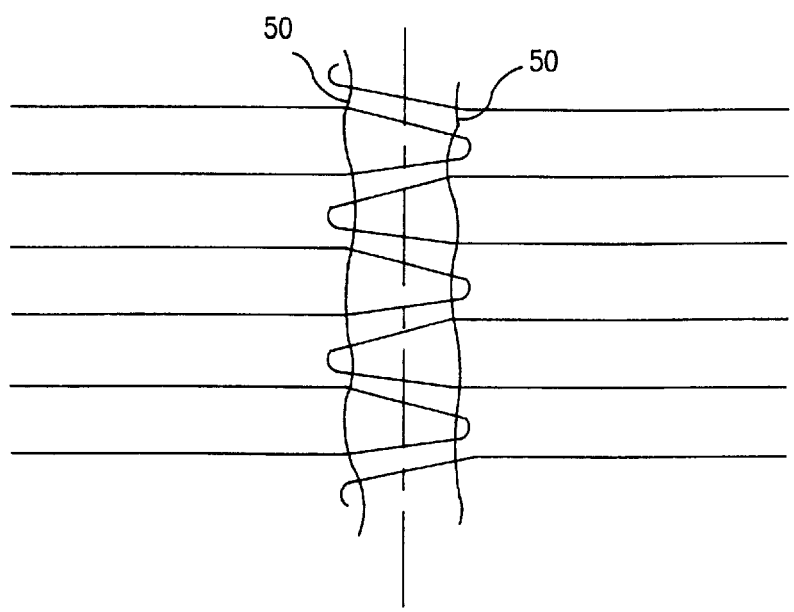
FIG. 4 shows a possible way of joining two half-carcasses together.

The loops may be laid side by side. To join them, use may in particular be made of a device for assembling the half-reinforcements by stitching or using one or more connecting filaments 50, as depicted in FIG. 4, or by lacing together the axially-distant loops of each carcass half-reinforcement passing alternately from one loop to the next using one or two lacing filaments. In FIG. 3, it can be seen that the strands that end in one and the same bead are all more or less the same length because the loops 5 are aligned. It is also possible to connect using bonding (for example spraying an adhesive that will allow the two half-reinforcements to be joined together at the crown, with or without a narrow strip to support the connection).

In the tire, the reinforcement that constitutes what is usually known as the belting plies also helps with mechanically joining the two carcass reinforcement portions together.

I claim:

1. A radial tire comprising two carcass half-reinforcements anchored on each side of the tire in a bead, the base of which is intended to be mounted on a bead seat of a wheel rim, each bead comprising at least one bead wire, said carcass half-reinforcements being joined together by connecting means, each carcass half-reinforcement including a carcass filament which is wrapped around said bead wire and forms adjacent strands running from said bead wire at least as far as said connecting means, said strands being arranged in a number of groups of two adjacent strands connected by a loop at said connecting means, said two adjacent strands of each group passing axially on the same side of the bead wire, and alternately axially on one side then on the other side of the bead wire, when passing from one group to the next group.

2. The tire as claimed in claim 1, wherein the strands which end in one and the same bead are all approximately the same length.

3. The tire as claimed in claim 1, wherein said connecting means are arranged under the tread of said tire.

4. The tire as claimed in claim 1, wherein said strands are arranged radially in the sidewall.

\* \* \* \* \*